June 24, 1969  H. B. CUMMINGS  3,451,107
PUG MILL APPARATUS

Original Filed Jan. 18, 1961  Sheet 2 of 5

INVENTOR.
HOWARD B. CUMMINGS
BY *Ely, Pearne & Gordon*
ATTORNEYS.

Fig. 6

United States Patent Office 3,451,107
Patented June 24, 1969

3,451,107
PUG MILL APPARATUS
Howard B. Cummings, New Castle, Pa., assignor, by mesne assignments, to Interpace Corporation, Parsippany, N.J., a corporation of Delaware
Continuation of applications Ser. No. 83,557, Jan. 18, 1961, and Ser. No. 215,106, Aug. 6, 1962. This application Oct. 27, 1966, Ser. No. 589,917
Int. Cl. B28b 3/20
U.S. Cl. 25—11        16 Claims

ABSTRACT OF THE DISCLOSURE

Pug mill to deliver cut bats of clay free of air and laminations. At a vacuum box between first and second stage augers, clay extrusions from the first stage are smeared to release air bubbles too small or too deeply embedded to burst out under the vacuum alone; residual air in vacuum box which might otherwise be occluded in second stage may be scavenged by steam. Between the outlet of the second stage auger and a nozzle extruding clay into rods from which bats of clay are cut, the clay enters an expansible chamber in which any laminae in the clay are folded. Intermittent pulses imparted by contraction of chamber's volume causes clay strata at interfaces of folded laminae to slip under pressure with respect to each other and thereby delaminate.

---

This application is a continuation of my prior applications, Ser. No. 83,557, filed Jan. 18, 1961, and Ser. No. 215,106, filed Aug. 6, 1962, both abandoned.

This invention relates to improvements in pug mills used in preparing clay in a plastic condition for production of ceramic articles and to a control to feed precisely measured amounts therefrom. More particularly, this invention relates to a de-aerating pug mill and means for controlling the intermittent feed therefrom of bats of clay which are thoroughly de-aerated and free of lamination.

As one of the earlier machines employed in the mechanization of the manufacture of ceramic articles, particularly dishware, on a production rather than a craft basis, pug mills have long been used to accelerate the homogenization of the water content of the clay as it is received from the clay house in the form of filter cakes. In such filter cakes, the proportion of water to the dry weight of clay is, at best, only an average for the entire output of the filter press, often varying from cake to cake (primarily due to the varying conditions of individual filter cloths and their location in the press) and characteristically varying widely in different portions of each cake, where the filtered clay is relatively soft, if not practically liquid due to a high moisture content, at the center of the cake and relatively dry at the outer edge of the cake. Fundamentally, a pug mill is an auger-feed extruder in which the non-uniform cakes, or vertical pie-shaped segments of stacked cakes (to provide a preliminary mixing of soft centers and drier edges of successive cakes in a single charge) are charged into the hopper of the pug mill, mixed by an auger screw, and discharged as continuous solid cylindrical extrusions of plastic clay, theoretically of uniform moisture content and plasticity throughout. Transverse lengths of such extrusion are cut off to provide the puck-shaped bats of clay placed on or in rotated plastic molds, where they are shaped by a jiggering tool to the desired ware shape, such as a plate, platter, cup body, or the like.

The foregoing mechanism and procedure for conditioning and preparing the plastic clay in the form of a bat for a jigger or other forming machine presents three major problems; one has long been recognized by the art and numerous attempts, with varying degrees of success, have been made to overcome it; the second has been vaguely recognized in actual shop practice but so far no practical solution has been reached. As for the third, and economically by far the most serious, recognition of the problem has heretofore barely been approached, let alone fully recognized or solved.

It is the object and advantage of this invention to provide a means and mechanism which solve the hereinafter set forth problems, which solutions are superior to those heretofore proposed, if proposed at all.

The first of the above major problems is that of providing a thoroughly deaerated plastic clay as it is extruded from the pug mill. As the unhomogenized clay is charged into the hopper of the pug mill, the leading edge or edges of the auger feed screw bites into portions of the charge to advance them toward the extrusion orifice of the mill, mixing and compacting the clay as it is advanced. Air is inevitably entrained between the portion of the clay as it is picked up and moved by the augers. In fact, in standard commercial pug mills if the proportion of air to clay taken into pug mill augers is minimized by overloading the hopper so that it will be substantially filled with clay, thereby minimizing the proportion of entrained air, optimum mixing and homogenization of the clay will not be obtained; it is for this reason that pug mill hoppers are generally manually loaded by operators whose experience and judgment dictate the size of the irregular chunks of unhomogenized filter cake to be charged into the hopper and the rate of loading them to avoid overloading and underloading the hopper.

The air entrained with the clay in a pug mill has long been recognized as a thorough evil mitigated only to the extent that it seems necessary if optimum mixing and homogenization of the clay is obtained. The entrained air should not be thoroughly and irretrievably disbursed throughout the clay for, if it is, its expansion as an occluded gas during firing will result in a weaker and more porous body, a result particularly undesirable in fully vitrified ware. Instead, standard and preferable auger screw design merely breaks the entrained air into substantial and discrete bubbles scattered at random through the clay. Unless the clay is de-aired in the pug mill, as the clay is compacted in the final stage of feed and extrusion from the pug mill, the air bubbles are compressed, but expand against the resistance of the plastic clay after the clay is extruded and is thereafter at atmospheric pressure. Depending upon the size and location of the bubbles in a bat of clay which has not been de-aired, these bubbles can cause various forms of surface defects, voids, and blisters in the jiggered green ware.

Various means for de-airing the clay while it is in the pug mill have been tried, such as screens or vents, off-center augers which provide for a central void into which the air may escape, and the like. The most nearly successful have been two-stage pug mills; the first stage of such mills extrudes the clay, in the form of a number of parallel cords of approximately one-half inch in diameter into a vacuum chamber; at the bottom or end of the vacuum chamber a second auger picks up the extruded clay, mixes and compacts it to extrude it in the form of a long continuous rod or bar suitable for cutting into bat lengths. The theory of operation of such multi-stage pug mills is that bubbles of air compressed in the clay in the first stage will burst out of the cords while they pass through the vacuum chamber, the escaping air then being withdrawn by the vacuum pump from the chamber; the theory is largely correct and operative, but overlooks and does not handle the air bubbles that are elongated and stretched out by the extrusion of the clay into cords at the first stage where such elongated bubbles are centrally located so that the extruded clay is not in the form of cords but are actually in the form of macaroni which is merely swollen but not burst as the clay passes through the vacuum chamber. A pug mill made according to this invention also releases such air that might otherwise be entrained into the clay in the second stage.

The second major problem presented by the clay feed mechanism heretofore available is that of cutting the extruded clay into precisely sized bats appropriate for the mold of the ware to be jiggered. This is particularly serious in the case of feed to automatic jiggering machines of the Miller or Wahl type. In such machines, the jigger molds are conveyed beneath the nozzle, a cutting wire is actuated to cut off a bat length from the extruded rod of soft clay so that the bat will fall on the approximate center of the mold. Since the diameter of the bat is controlled by the diameter of the extrusion nozzle, the volume of the bat needed for a given piece of ware is controlled by the length of the bat cut by cutting wire. When an automatic jigger is set up to produce a run of only one given size and shape of ware, the speed of the auger drive of a pug mill may be set to the timing of the mold conveyor so that a uniform and proper length of clay will be extruded and cut to a bat each time a mold is positioned beneath the extrusion nozzle of a pug mill. This procedure of controlling the volume of a bat has been far from satisfactory. Due to the varying conditions of the clay and the consequent varied manual input of clay into a pug mill, a pug mill will not extrude a constant volume of clay even if the auger is driven at a constant speed. Thus, if this manner of determining the cut bat length is employed, the speed of the auger must be set so that, at the minimum output for the auger speed, a sufficient volume of clay will be extruded to insure that no bat will be under size. This means that even the average bat will be over size thereby wasting clay in practically every jiggered bat. At the same time, the speed of the machine must be slowed down so that it can handle the maximum over size bat; even so, many over-thick and, thus, over-weight and uneconomical pieces of ware are produced.

The above problem of feeding an accurately sized bat has been further complicated by the need to increase the flexibility and variety of output of the automatic jiggers. Many automatic jiggers are now built, or have been revised, so that the mold conveyor will convey in succession a variety of molds for different sizes and shapes of ware. Thus, in any given run, a single automatic jigger may be set up to produce large dinner plates, small dinner plates, soups, cereals, saucers, etc., in the proportion which the potter's production requirements demand. In such a set up, the bats from a given extrusion nozzle will be cut to different lengths appropriate for the particular mold beneath the nozzle at the time a cut is made. Heretofore this was accomplished by driving the extruding auger of the pug mill intermittently, each integer of driving time being determined by length of bat required for a given mold beneath the nozzle. Thus, as a mold moved to a position beneath the extrusion nozzle, the motor driving the extruding auger started and ran until the length of clay cut the beam of an electric eye control to stop the motor and clay feed and activate the cutting wire to cut off a length of clay determined by the vertical distance between the electric eye beam and the path in which the cutting wire moved. If the succeeding mold called for a different length of bat, a mechanism keyed to the succeeding mold moved either the electric eye control or the cutting mechanism up or down so that a length of clay called for by the mold would be cut when the mold was positioned. With this arrangement, the variable length of clay extruded per revolution of the auger is irrelevant, for the auger turns until the required length of clay has been extruded, but the bats will still vary from the desired volume. Even if "anti-overrun" brakes are employed to stop the augers the instant the motor is cut off by the electric eye, the plastic clay itself is elastic and continues to move out of the nozzle until its elasticity causes the clay to retract into the nozzle. The irregular "bouncing" of the end of the extruded clay is quite pronounced and noticeable and results in irregular bats being cut. Thus, the average bat must be cut to over size to insure that the minimum bat will be adequate in volume while the speed of the machine must be slowed to accommodate over-size bats and, thus, minimize the production of thick ware.

On the pug mill bat feed control made according to this invention, the bats are extruded intermittently and the pug mill is also driven intermittently but the two intermittent drives are independent of each other and the time of driving the pug mill has no relationship to the length of any given bat to be cut. As a consequence, the bats, even when cut to different lengths for different successive molds, are more precisely cut. Accordingly, less clay is removed at the jiggering station for recycling in the pug mill. The effective output of the machine is increased and the inefficient production of ware of excessive thicknesses and weight is substantially lessened.

The third problem solved by this invention was that of the rejection of ware due to cracks developed during drying or firing. A cause of a number of such cracks, heretofore not attributed to the pug mill, has apparently been discovered and the cause eliminated, resulting in a substantial decrease in the proportion of ware heretofore rejected after the drying stage and after the firing stage.

The solution to this third problem comes from the observation that, while the configuration of some cracks could be readily explained from loss of volume during drying and firing, the pattern of and geometry of others was very difficult to account for on this basis alone. Efforts to find factors contributory to the factor of shrinkage in causing this latter type of cracks were to no avail until two possible factors were suspected. Retracing every manipulation and possible behavior of the clay back from the stage of firing the ware, it was finally appreciated that, as one factor, when the clay is discharged from the auger feed within the pug mill to the extrusion nozzle, the clay flows together from both sides of the trailing edge of the helical blade of the auger. This could mean that, as a second factor, when the surfaces formed in the clay as it left the auger blades were brought together, there would not be sufficient action akin to "slickenside," to actually weld the surfaces together, but indeed, there would only be a tight fold or lamination that would remain in the clay as it was subsequently extruded, cut to bat lengths, and then shaped by jiggering. "Slickenside" is a term used in the art to designate a manipulation used to fuse or weld two surfaces of clay. That is, if two surfaces of plastic clay are simply pressed together, a homogeneous mass of clay may appear to result. But, on drying or firing, the apparent unitary mass may separate at the latent interface which remained when the surfaces of the mass were pressed together. However, if the surfaces are given a "slickenside," that is, given a slight relative movement with respect to each other as the surfaces are pressed together, the latent interface is destroyed and an actual weld or fusion will result.

Analysis of the action of the clay in the pug mill made according to this invention and the disappearance of many cracks heretofore unsatisfactorily explained appears to confirm the foregoing analysis of the cause of numerous heretofore unsatisfactorily explained drying and firing cracks and the solution to the problem effected by this invention.

Other objects and advantages of this invention will be apparent from the following specification, claims, and drawings in which:

Figure 1:
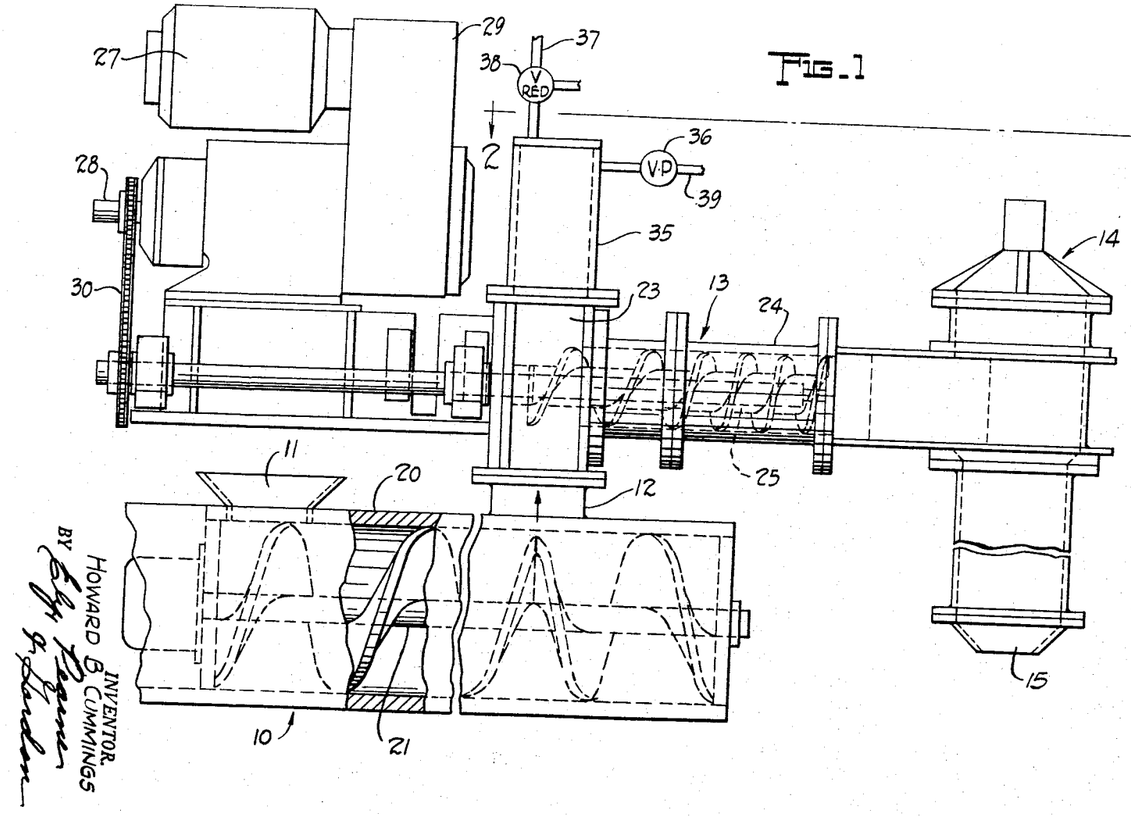
FIGURE 1 is a side elevational view of a pug mill apparatus adapted for use in conjunction with the present invention.
Figure 2:
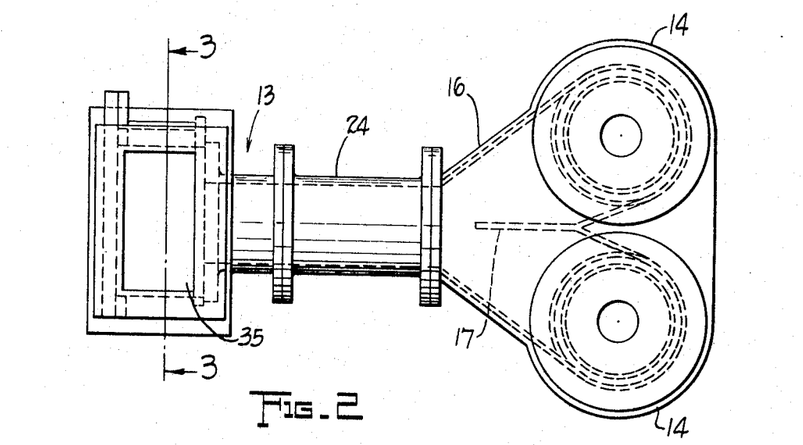
FIGURE 2 is a fragmentary top elevational view of a portion of the pug mill apparatus taken on the line 2—2 of FIG. 1.

Referring now to the drawings, and to FIGS. 1 and 2 in particular, there is shown a preferred pug mill construction comprised of a preliminary pug mill 10 having a hopper 11 at one end and an outlet passageway 12 at the other end. The outlet passageway 12 from the pug mill 10 is connected to a secondary pug mill and deairing chamber, generally designated by reference numeral 13, from which the mixed clay is adapted to be fed into a pair of cylindrical clay storing and feeding vats 14. The pugged clay contained in the vats 14 is intermittently expelled therefrom, as required, through the dies 15 by an apparatus and control system hereinafter discussed in detail.

In the illustrated construction, the preliminary pug mill 10 is essentially a cylinder 20 of a suitable rugged construction to withstand the heavy pressures created by the pugging operation. An auger 21 is provided within the cylinder 20 for mixing, kneading and cutting the mixed or partially mixed clay ingredients introduced into the mill through the hopper 11, and this auger axially extends substantially the full length of the cylinder. As shown, the blades of the auger from the left end thereof, as viewed in FIG. 1, to a point beneath the outlet passageway 12 are pitched so that the clay material will be fed toward the outlet passageway during the pugging operation. The blades at the right end of the auger 21 are shown in FIG. 1 to be pitched in an opposite direction, so that the opposing blades push the pugged clay upwardly and out through the outlet passageway 12. The auger 21 is rotated on its axis by suitable motors 22 which may be mounted at the end of the cylinder 20 and directly connected to the auger shaft, or which may be located at remote positions and connected to the auger by a conventional drive mechanism.

The outlet passageway 12 from the preliminary pug mill 10 connects to the housing 23 at the rear end of the secondary deairing pug mill 13. In the illustrated construction, the forward end of the mill 13 also is essentially a cylinder 24 which forms a bore for a second auger 25 axially extending through the cylinder from the housing 23. As shown, the auger 25 is connected at its rear end to a rotatable shaft 26 which extends through the rear wall of the housing 23. This shaft 26 and the connected auger are driver by a motor 27 which is drivingly connected to an intermediat shaft 28 by a Reeves drive (not shown) enclosed in the casing 29. The shaft 28, in turn, drives the shaft 26 by an endless chain 30.

Figure 3:
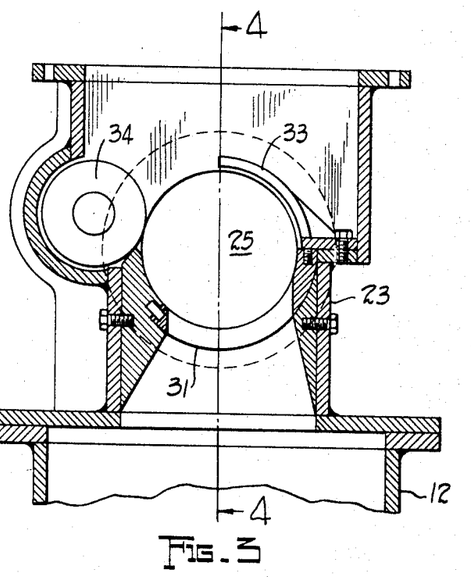
FIGURE 3 is a vertical cross-sectional view taken on the line 3—3 of FIG. 2.
Figure 4:
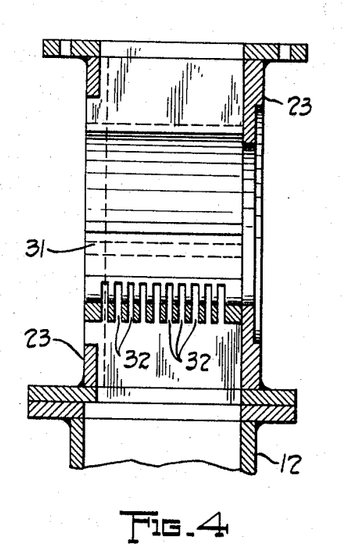
FIGURE 4 is another vertical cross-sectional view taken on the line 4—4 of FIG. 3.

In accomplishing a major objective of the present invention of producing a dense and homogeneous clay column free of air bubbles and/or voids, the clay column extruded from the first pug mill 10 is cut or shredded into ribbons in a vacuum prior to the second pugging operation. To this end, the clay column passing from the outlet passageway 12 is forced through an arcuate extrusion plate 31 which is disposed below the rear end of the auger 25 in the housing 23. As shown in FIGS. 3 and 4, this plate 31 includes plurality of slots 32 extending from one side edge of the plate to the other. Preferably, the blades of the auger 25 are in wiping contact with the plate 31 so that the ribbons of clay extruded through the slots 32 will be wiped or smeared transversely across the inner face of the plate 31 beyond the slots 32 by the blade of the auger 25.

Mounted on the upper open end of the housing 23 is a vacuum chamber 35 connected to a suitable vacuum pump 36, whereby a relatively high vacuum is maintained in the housing 23. Thus, as the clay is extruded through the slots 32 into the housing 23, air entrained with the clay as it was fed into the hopper 11 and compressed by the pressure developed in the primary pug mill 10 may expand to form bubbles or cores in the ribbons. The shearing and smearing action of the blade of the auger breaks such bubbles and cores so that the air then escapes into the chamber 35 and is evacuated by the pump 36.

A quarter-arcuate plate 33 is provided at the upper right side of this auger 25, as viewed in FIG. 3, and a roller 34 is located at the upper left side of the auger. The plate 33 also is closely adjacent the blades of the auger so that the day which is carried upwardly by rotation of the auger will be wiped or smeared a second time across the face of the plate. This second wiping or smearing action assures that the clay will be completely worked to eliminate any remaining air bubbles or cores. The roller 34, which is in contact with the auger 25, forces the desired clay between the auger blades so it may be readily fed toward the exit end of the housing 23 and into the cylinder 24.

It is believed that the effectiveness of the deairing operation described above may be further increased by introducing a carrier gas into the deairing chamber 13, preferably superheated steam, i.e., steam containing sufficient heat to remain dry at the low pressures created in the chamber 35. As shown in FIG. 1, this is accomplished by a steam line 37 connected to the vacuum chamber 35 from a suitable source (not shown) through a pressure reducing valve 38.

By maintaining an atmosphere of steam at sub-atmospheric pressure in the housing 23 and vacuum chamber 35, the air released from the clay, as it is cut to short ribbon lengths and kneaded in the housing 23, diffuses into the steam and is scavenged by the flow of steam to exhaust through the vacuum pump and ejection line 39. Further a certain amount of the atmosphere within the housing 23 will entrain with the clay as it is moved from the housing 23 and compacted in the cylinder 24 by the auger 25, just as atmospheric air was entrained at the hopper 11. By maintaining a relatively high vacuum in the chamber 35, and without the introduction of steam, the actual weight of air re-entering with the clay in the cylinder 24, per pound of clay, is insignificant for nearly all practical purposes and the clay will be desired more effectively than in prior mills which did not so effectively knead the clay in a vacuum. However, by maintaining a steam atmosphere in the housing and chamber, the steam entrained with the clay fed into the cylinder 24 is simply compressed to water and absorbed in the clay so that clay, as it is discharged from the mill 13, is effectively degassed.

Clay feed into storage vat

As the effectively desired clay is discharged from the secondary pug mill 13, it is fed to one or more clay storage and feed vats 14 through a manifold 16. The passageway of the manifold is preferably divergent toward each vat 14, such divergence in the specific embodiment shown in FIG. 2 being provided by the divider plate 17. The purpose of such outward divergence is to constrict or block reverse movement of the clay when, as will be apparent below, pressure is developed in the vats 14 during interims when the pug mill is not operating and no clay is being discharged into the manifold from the cylinder 24.

Figure 5:
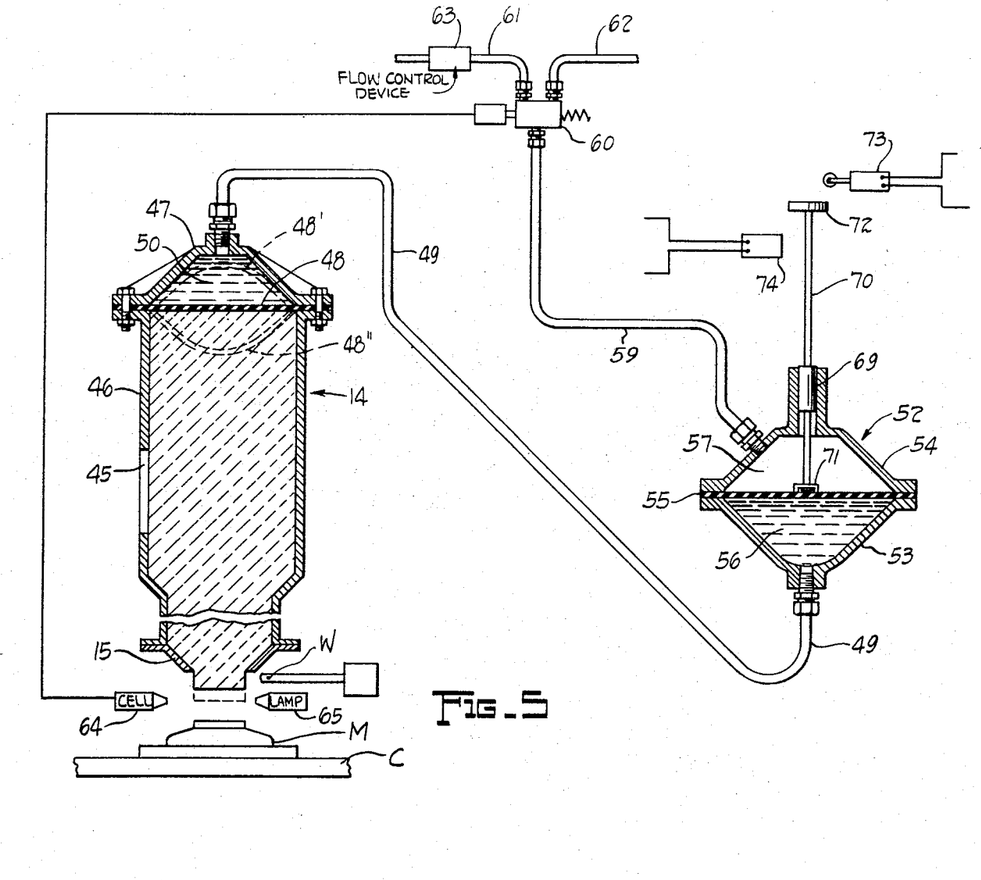
FIGURE 5 is a schematic, diagrammatical view, partially in cross-section, of a portion of the pug mill and pug mill control system comprising the present invention.

FIG. 5 shows in cross-section one of the cylindrical storage and feed vats 14, and further schematically illustrates the structure and controls for intermittently expelling the contained clay. In the illustrated construction, each vat 14 is formed by a substantially cylindrical casing 46 having a side opening 45 near its top connecting with the manifold 16 through which the clay is forced when the auger 25 is operating. A substantially dome-shaped head 47 and diaphragm 48 close the upper casing 46 and the die 15 is fastened to the open bottom end. The die 15 is preferably one of a set of interchangeable extrusion dies or nozzles conventionally connected to the discharge opening of the pug mill. The diameter of die opening controls the diameter of the bat of clay extruded.

In accordance with the invention, the plastic clay is intermittently and independently extruded from each of the vats 14 through its die 15 by downward flexing impulses of the extensible diaphragm 48 which is of rubber or similar flexible material. The diaphragm 48, which is peripherally clamped between the top of the casing 46 and the casing head or dome 47, extends across the bottom of the dome-shaped head to form a flexible bottom wall of a liquid-filled accumulator 50. A conduit 49 is connected to the top of each casing head 47 for admitting liquid to the accumulator.

Considering the clay feed apparatus as described thus far, it will be apparent that, with reverse flow of clay through opening 45 blocked by the divergence of the manifold 16 and a stopped auger 25, an input of liquid into the accumulator 50 will, when the vat 14 is completely filled with plastic clay, as shown in FIG. 5, force an equal volume of the relatively incompressible desired clay out of the die 15. The pressure of the liquid in the conduit 49, will of course, have to be such that the product of the pressure times effective area of the diaphragm 48 will exceed the resistance of the clay to extrusion through the die 15. On the other hand, since the increments of liquid put into the accumulator 50 are introduced only intermittently and the pressure of the liquid in the conduit 49 is effectively zero between pressure intervals (as will be explained in connection with the bat cut-off control described below) it will be seen that, in the interim between pressure cycles in the conduit 49, input of clay into the vat 14 by operation of the pug mill 13 will stretch or force the diaphragm 48 upwardly from its plane configuration shown in FIG. 5 to expel liquid from the accumulator 50 until the diaphragm is stopped by pressing against the inside of the casing head 47, thus, assuming the configuration indicated by the dotted line 48′. The pug mill is then stopped by the pug mill control system (also described below) and no more clay is fed into the vat 14 until, by increments of liquid input into the accumulator 50, the diaphragm expels clay through the die 15 until the diaphragm is distorted downwardly to a position represented by the dotted line position 48″, at which time operation of the pug mill resumes and clay is again fed into the vats 14. The downward distortion of the diaphragm to the position 48″ is about equal to the upper distortion to the position 48′, as indicated, and the volume of clay input in the vat in any one period of operation of the pug mill is approximately equal to the volume represented between the position 48′ and 48″.

Elimination of laminations

In the apparatus as shown, the intermittent extrusion of a bat length of clay during downward pressure moving of the diaphragm and the independently intermittent feed of clay into the storage vat operates to provide a bat of clay which is free of laminations, which might develop into and show up as drying and firing cracks, in the following manner.

As explained at the outset of this disclosure and the statement of the problems solved by the present invention, as the clay leaves the auger 25 and it is extruded from the cylinder 24 into the manifold 16, its cross-section would be circular with at least one incipient line of cleavage running from the center to the circumference, this line of cleavage being formed by the interface of the surfaces of the clay that leave either side of the auger blade and the core of the auger and are folded together as the clay passed into the manifold 16.

Even though there may be some turbulence of flow in the clay through the manifold 16, the line of cleavage presumably persists even as the clay is fed into the vat 14 in the increments represented by the volume between positions 48′ and 48″ of the diaphragm 48, just as the incipient cleavage lines would persist if the clay were extruded directly from the auger through an extrusion die similar to the die 15. As a charge of clay comes to rest in the vat 14, however, it is subjected to alternate periods of pressure and zero pressure as increments are extruded through the die 15 by action of the diaphragm 48. It will be observed in FIG. 5 that as diaphragm 48 moves downward from position 48′ to 48″, it necessarily assumes a slightly different curvature at each pressure impulse and imparts the changed curvature to the mass of clay beneath it.

Thus assuming that the interface of the incipient line of cleavage in a mass of clay charged into the vat 14 is parallel to median plane of the the diaphragm, as shown in FIG. 5, it is apparent that the next pressure impulse will bend the interface and cause the opposite surfaces thereof to move slightly with respect to each other, just as the pages of a flat magazine will move slightly with respect to each other if the magazine is bent. Actually, of course, it is irrelevant how the interface of incipient cleavage is distorted and located with respect to the diaphragm since the sudden distortion of the mass of clay in the vat by a pressure impulse will cause slight relative movement of the portions of clay on either side of the interface. Thus, it is this slight slippage at the interface at the moment of a pressure impulse that supplies the "slickenside" that destroys the interface and welds the clay into a homogeneous, lamination-free mass when it is eventually extruded through the die 15.

Bat cut-off control

Each of the conduits 49 connects to an intermittent pressure impulse device 52 for supplying an increment of fluid to the accumulator 50 of the associated vat 14. The pressure devices 52 comprise rigid, hollow shells which are formed by a pair of substantially corresponding cup-shaped members 53 and 54, each generally similar to the casing head 47. A flexible diaphragm 55 is peripherally clamped between the members 53 and 54 and divides the pressure device into a liquid compartment 56, defined by the member 53, and the fluid pressure compartment 57, defined by the member 54. The conduit 49 is connected to the lower member 53 so that a constant volume of liquid contained in the liquid compartment 56, conduit 49, and accumulator 50, may be forced in increments by the diaphragm 55 through the conduit into the accumulator 50 upon a pressure impulse in the compartment 57. There is a back-flow, of course, when the pug mill is actuated to move the diaphragm 48 from position 48″ to position 48′. Thus, it will be noted that total fluctuations in volume of liquid in the compartment 56 and accumulator 50 are the same, but the amount of liquid in one is the complement of the other at any given instant. Thus, the limitation on upward expansion of the diaphragm 48 imposed by the casing head 47, when the volume of liquid in the accumulator is at a minimum, prevents the over-distortion of the diaphragm 55 when the volume in the compartment 56 is at a maximum. Likewise, the configuration of the lower member 53 of the pressure device 52 prevents the over-distortion of the diaphragm 48 when the volume of the liquid in the accumulator is at a maximum.

The fluid pressure compartment 57 of the device 52 is pressurized through a conduit 59. This conduit is connected to one port of a 3-port, two-way valve 60 which may be actuated by a solenoid, by a pivot valve, or the like. In one position of the valve 60, the conduit 59 is connected by a branch line 61 to a suitable constant pressure fluid source (not shown). In the second position of the valve, the conduit 59 is connected to a branch line 62 which may exhaust to a sewer or to a sump. Preferably, a flow rate control device 63 is interposed in the line 61 to control the rate of fluid flow to the device 52 when in communication with the constant pressure fluid source (usually and conveniently a plant water line).

The operation of each of the two-way valves 60 is controlled by a circuit connected to a photoelectric cell 64 positioned a predetermined distance beneath and at one side of the associated die 15. The valve operation is such that, when the photocell is energized by a light source 65 on the opposite side of the die 15, the valve 60 will be moved to its first position to connect the conduit 59 with the pressure line 61. In this position of the valve, fluid under constant pressure is admitted at a controlled rate to the pressure compartment 57 of the device 52, thereby forcing liquid from the compartment 56 into the connected accumulator 50 and extruding an equivalent volume of clay as a cylindrical bat through the die 15. As soon as the light source 65 is interrupted by the extruded of clay from the die 15, to de-energize the photocell 64, the valve 60 snaps to its second position to connect the conduit 59 to the exhaust line 62 and block off the pressure inlet line 61, and end the pressure impulse on the diaphragm 55. This, of course, stops the extrusion of the clay bat from the die 15 at a precise length determined by the volume of the increment of fluid forced into the accumulator 50 and the cross-sectional area of the orifice of the die 15.

Whether the pug mill is operating to re-charge clay into the vat during the extrusion of a clay bat of a given length through the die 15 or is stopped is wholly immaterial to the precise extrusion of a given bat-length of clay in response to a pressure impulse from the device 52. As soon as the extruded bat interrupts the light beams to deactivate the photocell 64 and open the valve 60 to exhaust, pressure in the conduits 49 and 59 drops to zero and continued input of clay in the vat 14 simply raises the diaphragms 48 and 55 and exhausts fluid in the pressure compartment 57 back through the conduit 59.

The intermittent extrusion of bat-lengths of clay is keyed to the associated jiggering machine in the following manner: With a length of clay extruded from the die 15, the intermittent mold conveyor C of the jiggering machine positions a mold M beneath the die 15 and at the same time the cut-off wire W is actuated (usually by a solenoid to cut a bat-length and allow it to drop on the mold beneath). This clears the light beam to actuate the photocell 64 and starts the pressure impulse, which continues until clay is extruded to break the light beam and end the pressure impulse, with a fresh length of clay extruded and waiting to be cut as soon as the next mold is positioned beneath the die. With only the mass of clay in the vat 14 being moved enough to extrude the desired length, and with the effect of the inertia of the intermittently operated pug mill, the "bounce" of the clay as its extrusion through the die 15 is started and stopped is barely perceptible and, in any event, ceases by the time the cut-off wire is actuated to commence another pressure impulse.

With this precise control, it is even possible to cut successively different lengths of bat, assuming that successive molds calling for different sizes of cut bats are portioned beneath the die. By keying the relative vertical position of the photocell 64 and the cut-off wire W with respect to a given mold positioned beneath the die, the appropriate length of bat for that mold will be cut.

Pug mill control

The upper member 54 of each pressure device 52 is provided with a packing gland 69 through which a control rod 70 is slidable.

Each of the rods 70 has an enlarged base 71 at its lower end seated on the associated diaphragm 55 so that the flexing movement of the diaphragm will produce corresponding vertical movement of the rods.

The upper end of each rod 70 has a switch actuating head 72 for actuating the pug mill motor switches 73 and 74, there being a pair of such switches disposed at the upper and lower limits of travel, respectively, of each rod.

The lower switch 74 is preferably a normally open proximity switch which is actuated when the clay in the vat 14 is discharged so as to lower the diaphragm 48 to its lower position 48" and, correspondingly, drop the diaphragm 55 and its associated rod 70. Actuation of the lower switch 74 actuates a holding relay to start the pug mill motor or motors 22 and 27 and commence the charging of clay into the associated vat 14 until the rod 70 is raised, whereupon it actuates the microswitch 73 to release the relay and stop the motor or motors.

Where, as shown in FIG. 1, a plurality of vats 14 are charged from one pug mill through a manifold, the lower switches 74 are connected in parallel so that actuation of either (or any one, in case more than two vats are charged by a single mill) will start the pug mill and insure that no vat will be "starved" for clay. On the other hand, when a plurality of vats are charged from a single mill, the upper microswitches are connected in series so that all must be actuated before the pug mill motor is stopped. Adequate manifold design and resistance of the clay to extrusion through the dies will divert the flow of clay from a completely filled vat to one not so filled until all are completely filled.

It will be apparent from the above description of the invention that there has been provided a novel pug mill construction for preparing clay in an improved manner wherein the extruded clay column is a homogeneous mass substantially entirely de-aerated and free of laminations and cracks. Moreover, the disclosed system of feeding the clay from the pug mill into storage vats and intermittently forcing the clay from the pug mill into storage vats and then intermittently forcing the clay from the vats by the controlled application of fluid pressure adapts the invention to present-day practices for shaping ceramic ware which requires clay bats of different but precisely controlled volumes.

Figure 6:
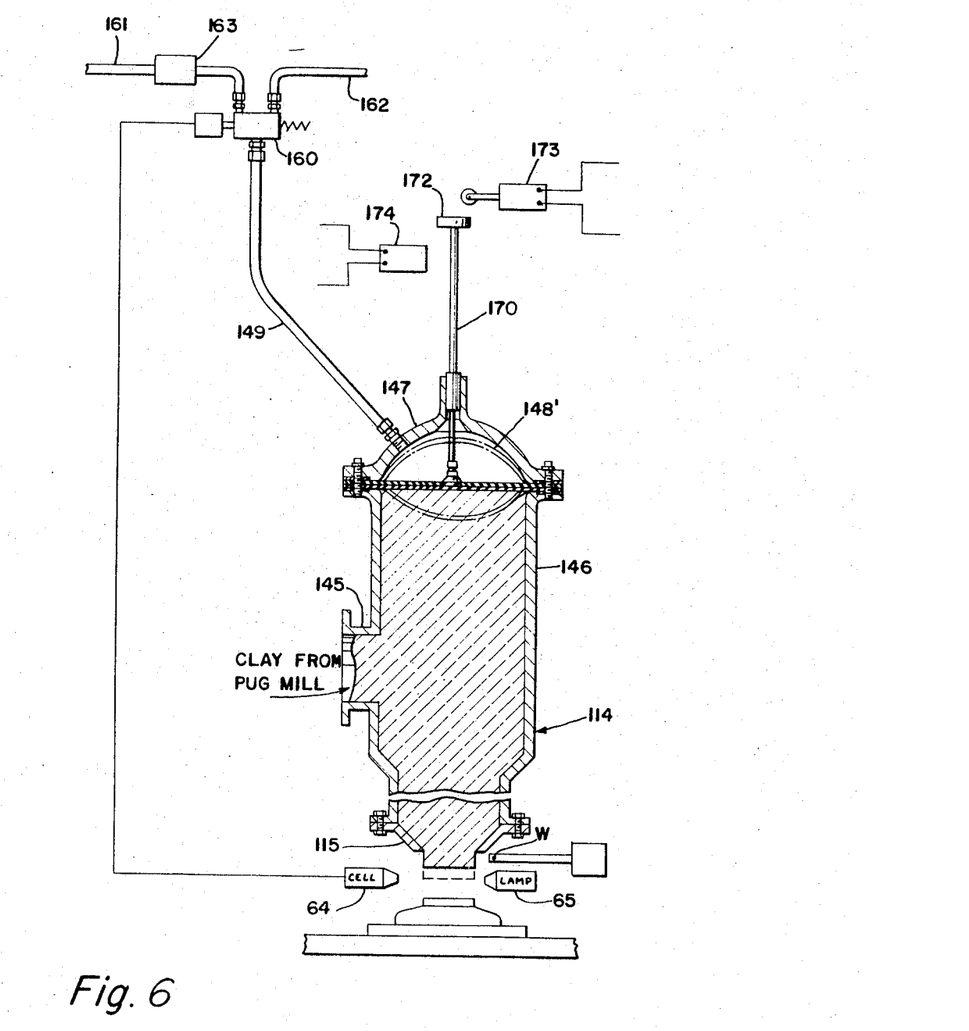
FIG. 6 is a vertical cross-section, partly diagrammatic showing a delaminating vat and bat feed control, modified and simplified from that shown in FIG. 5, made according to this invention and adapted to be connected to a suitable deairing pug mill, exemplified by but not necessarily of the same construction a sthat shown in FIGS. 1 to 4.

FIG. 6 shows a pug mill control and bat-feed apparatus made according to the invention and comprising a clay vat 114 provided with an extrusion die or nozzle 115 mounted on its lower end. The die 115 may be one of a set of interchangeable dies to permit bats of various diameters to be extruded as are appropriate for the size of ware programmed for a jiggering machine served by the apparatus. The vat 114 is stationed above a conventional intermittently advanced conveyor belt C carrying jiggering molds M. As the jiggering molds M are advanced by the conveyor, a mold will be positioned directly beneath the die 115 each time the conveyor stops during its course of advancing the molds beneath bat feed devices to receive bats of clay; these bats of clay are then formed into green ware by the jiggering machine which receives the bat-loaded molds from the conveyor.

As shown in FIG. 6, the body of the vat 114 comprises a large cylindrical portion 146 provided with a suitable side opening 145 permitting the vat 114 to be connected to the discharge orifice of a pug mill, either directly or by means of a manifold in case two or more vats are supplied by a single mill (as shown, for example, in the co-pending parent application). The upper end of the vat cylinder 146 is closed by an accumulator dome 147 separated from the interior of the vat 114 by diaphragm 148 clamped around its periphery by the suitably gasketed and bolted flanges 461 and 471 of the cylinder 146 and dome 147, respectively. The interior of the accumulator dome 147 is normally filled with water or other hydraulic fluid supplied through a line 149 which, in turn, is connected to a three-part, two-way valve 160 actuated by a solenoid pilot valve, or the like. In one position the valve 160 connects the line 149 to a source of fluid pressure (not shown but usually and conveniently a plant water line) through a pressure line 16. A flow rate control device 163 is preferably interposed in the line 161 between the source of pressure and the valve 160 to control the rate of flow to the dome 147 when the valve 160 is positioned to connect the lines 149 and 161. Except when the valve 160 is actuated to connect the lines 149 and 161, the valve normally connects the line 149 to an exhaust line 162 leading to a sewer or sump so that, when the lines 149 and 162 are connected, the hydraulic fluid in the accumulator dome 147 is under substantially zero pressure.

Bat-feed operation—clay delamination

Clay from the associated pug mill, preferably thoroughly de-aerated, is fed into the vat 114 until the diaphragm 148 is flexed to its uppermost position 148', at which time the clay feed is stopped by the controls to be described hereafter. During such feeding action, the resistance of the clay to extrusion through the die 115 is substantially greater than the resistance of the diaphragm 148 to flexing against the normally zero pressure of the hydraulic fluid on the dome 147 so that there is substantially no extrusion through the die 115 during the vat-filling operation (unless, during such filling operation, the diaphragm is subjected to a pressure pulse from the line 161 by the actuation of the valve 160, as described hereafter).

Assuming that the vat 114 is sufficiently filled and a bat has been cut from the column of clay extruded through the nozzle 115, a lamp 65 directs a beam of light to the photo-electric cell 64, the beam being interposed between the jigger mold M and the nozzle 115 above it. The thus actuated cell 64 is connected to the valve 160 so as to actuate it and connect the pressure line 161 to the line 149 and introduce fluid under pressure into the dome 147, force on the clay caused by the pressure on the line 161 on the diaphragm 148 being greater than the resistance of the plastic clay to extrusion through the nozzle 115, but less than pressure necessary to cause back flow of the clay through the inlet 145. Accordingly, a column of clay is extruded from the nozzle 115 until it reaches the dotted line position shown in FIG. 1, where the column interrupts the beam from the lamp 65 and deactivates the cell 64, causing the valve 160 to disconnect the line 49 from the pressure line 161 and open it to the exhaust line 62. This pressure pulse preferably occurs while the mold M, with a previously cut bat dropped on it, is still resting under the nozzle 115. This allows the extruded column of clay (which is noticeably elastic and tends to "bounce" up and down as the pressure impulse ends) to come to rest at a set distance beyond the orifice of the nozzle 115 at least during the period a bat-loaded mold is advanced by the conveyor and a succeeding unloaded mold stops beneath. At the instant the unloaded mold M comes to rest in its position beneath the nozzle 115, a cut-off wire W mounted in a conventional solenoid or otherwise actuated fork is reciprocated through the extruded column of clay to drop a cylindrical bat of clay on the mold beneath, the volume of the thus measured and cut bat being equal to the volume of fluid introduced in the dome 147 during the pressure impulse in the line 149. With the beam between the lamp 65 and cell 64 reestablished, the cycle is repeated for each successive mold.

Although the volume of a given bat of clay is determined by the amount of fluid introduced in the dome 147 during the pressure impulse by the line 149, that volume of fluid is determined by the diameter of the extruded column of clay and the vertical distance between the path of the cut-off wire and the light beam between the cell 64 and lamp 65. This distance may be manually set by supports (not shown) for the lamp and cell if successive bats of a constant size are to be cut. If the jiggering machine calls for a succession of differently sized bats, the volume of any given bat may be set by a programming cam in the conveyor drive, such a cam (not shown) raising or lowering the cell and lamp so as to set the size of the bat to that required by the mold immediately preceding the mold upon which a cut bat is dropped by actuation of the cut-off wire. In either case, the bat is cut to a precise size because the cut-off wire is not actuated until the extruded length of clay therefor has come to rest beyond the nozzle 115, after the pressure impulse ends, at the precise distance between the path of the cut-off and the beam between the lamp 65 and cell 64.

As explained in the above-identified co-pending application, it has been discovered that the blades of the augers by which clay in a pug mill is forced therefrom apparently develop interfaces between portions of the clay as it leaves the augers. Further, unless these interfaces are eliminated, they may persist as laminations, even after forming the bats of clay into green ware; these laminations may show up as theretofore unexplicable cracks which can develop as the green ware shrinks during drying preparatory to firing or as the dried ware shrinks during firing in the kiln. Losses of ware due to firing cracks are particularly serious since they constitute not only practically completely unrecoverable losses in material and labor but also losses due to ineffective use of plant capacity. The high quality of ware produced with equipment made according to this invention and that of the above co-pending application now leads to the further suspicion that even when laminations which can be traced back to the pug mill do not show up as visible drying or firing cracks, they may cause warping of the ware during firing or remain as incipient lines of cleavage weakening the ware during use. Just how such equipment eliminates such posible laminations and the losses and poor-quality ware attributable thereto is not yet fully and positively explainable. It is suspected, however, that the delamination probably occurs in the following manner:

As the clay is fed into the vat 114, such laminations or striations in the clay will persist despite such folding as may occur as clay fills the vat 114 from the side inlet 145. Then, as the body of the clay is subjected to relatively sudden pressure impulses as bat lengths are extruded, there will be a slight relative movement of the lamina or striation relative to each other and their interfaces; this slight movement at the moment of a pressure impulse supplies the "slickenslide" that destroys the interfaces and welds the clay into a homogenous, delaminated mass when it is eventually extruded through the die 115.

Diaphragm construction, pug mill control, and operation

Figure 7:
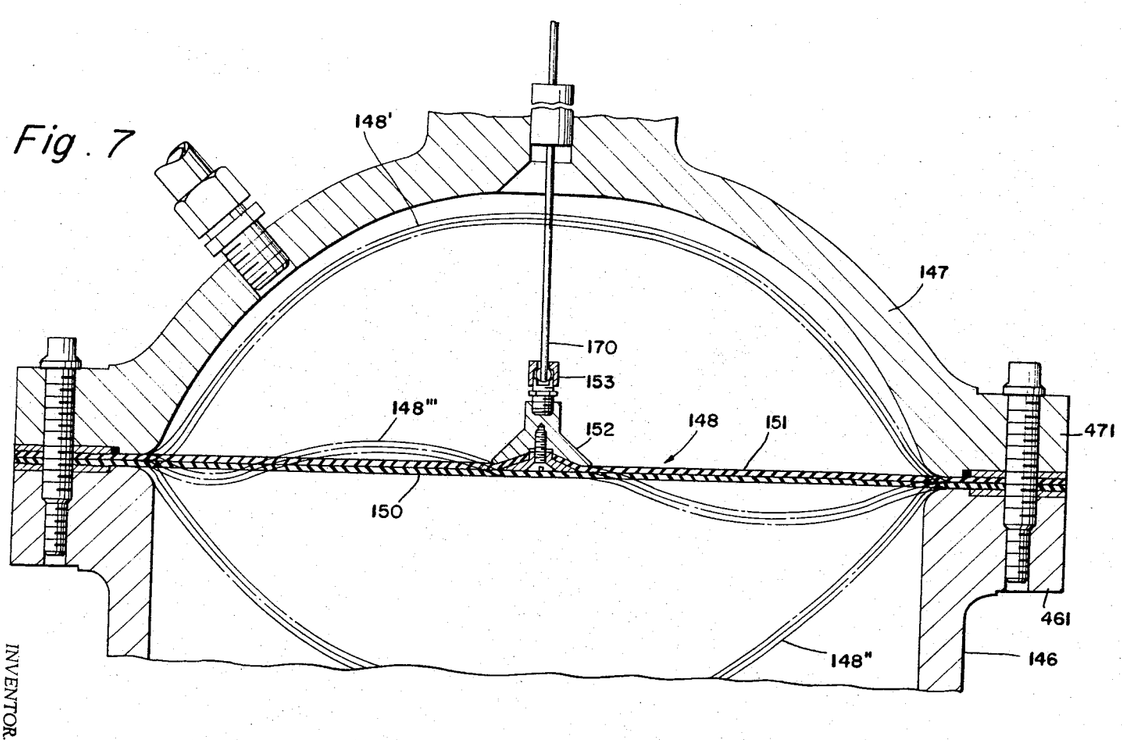
FIG. 7 is an enlarged detail of a diaphragm used in the apparatus shown in FIG. 6.

As indicated in FIGS. 6 and 7 and from the foregoing description, the space between the dome 147 and the diaphragm 148 is filled during the pressure impulse with successive increments of fluid. This continues until the diaphragm moves from its uppermost position 148' to its lowermost position 148", the volume between the two positions being equal to that of a number of bats of clay delivered from the nozzle 115.

As shown in detail in FIG. 7, the diaphragm 148 is comprised of two plies, one being a lower continuous ply 150 contacting clay in the vat 114 (air with in the vat prior to the first filling with clay is allowed to bleed out between the ply 150 and the flange 461, the flange 461 and 471 being finally clamped tight when the vat 114 is initially filled). The second and upper ply 151 of the diaphragm carries a central nut 152 into which is secured a ball-and-socket fitting 153, whereby a control rod 170 is attached to the center of the ply 151. This type of connection permitting limited universal movement of the diaphragm with respect to the control rod is preferred since the viscosity of the clay in the vat does not always permit the diaphragm, in moving between its upper to lower flexed positions 148' and 148", to assume regularly convex and concave shapes or necessarily assume the flat intermediate shape shown in solid lines in FIG. 6 and 7. Instead, in its various intermediate positions, the diaphragm may be irregularly flexed, as shown, for example, in its intermediate dotted line position 148''' in FIG. 7. Thus, the universal connection afforded by the fitting 153 permits the control rod 170 to follow the movement of the diaphragm 148 and reciprocate in and out of the dome 147 without undue binding on the packing gland 154 through which the rod 170 passes in such reciprocation. To aid such flexing of both the plies 150 and 151 without undue wear and chafing, a few drops of glycerine or other suitable lubricant is preferably employed between the plies.

The control rod 170 is provided with a switch-activating head 172, which operates the upper and lower limit switches 173 and 174, respectively. The lower switch 174 is preferably a proximity switch which, when actuated as the head 172 approaches it, in turn actuates a holding relay to start the drive of the associated pug mill and feed clay into the vat 114 through the side inlet 145. Clay fed into the vat will then raise the diaphragm 148 and rod 170 until its head 172 hits the microswitch 173 to open the holding relay (not shown) and stop the pug mill drive. If, similar to the corresponding pug mill controls disclosed in the embodiment shown in FIGS. 1 to 5, a plurality of bat-feed devices as shown here are connected to a single pug mill through a suitable manifold, the respective switches 74 are preferably connected in parallel to the motor-starting relay so that, as the diaphragm 148 in any one of the vats approaches its position 148", its associate control rod head will actuate a switch 174 and commence the feed of pugged clay into the manifold and thence to the vat calling for clay; the upper switches 173 are connected in series to the relay so that all vats will be filled before the pug mill is stopped.

As indicated at the outset, optimum results are obtained when the above-disclosed apparatus is used in combination with a pug mill which delivers the clay to the vat in a completely de-aired condition. It is to be understood, of course, that the clay should also be delivered to the vat 114 in completely homogenous condition, both as to the ingredients of the clay and the water content rendering it plastic.

It is also to be understood that this invention is not to be construed as limited to the specific embodiment shown. Variations and modifications to meet the needs and objectives of specific installations and applications may be made by those skilled in the art. For example, if the pug mill with which a bat feed and control means made according to this invention is associated is provided with a variable speed drive, rather than operating the pug mill intermittently to meet the demands of the vat for clay, the control rod 170 or other sensing means may operate such variable speed so that the pug mill operates substantially consistently but at varying outputs to meet the fluctuation in demand for clay by the vat. Still other variations and modifications will occur to those skilled in the art and, accordingly, the scope of this invention is not to be limited by the appended claims and not restricted to the specific embodiment and variations disclosed.

As the vat 114 is refilled and the diaphragm 148 is flexed to its position 148", fluid in the dome 147 flows back through the line 149 and the valve 160 (in its normal position) into the exhaust line 162. Momentarily during such vat-filling operation, the demand of the conveyor for cut bats may actuate the valve 160, whereby a pressure sufficient to extrude clay through the nozzle 115 will be built up in the vat until such pressure is released by the extrusion of the desired length of clay and the consequent shifting of the valve 160 back to its normal position opening the line 149 to exhaust. To prevent such pressure caused by actuation of the valve 160 from causing back-flow into the clay inlet 145 rather than extrusion of the desirable bat length, the clay is delivered into the vat under greater pressure than that required to extrude it through the nozzle 115. When the bat-feeding pressure impulses occur during the periods when the vat is adequately filled with clay so that no supply from the pug mill is called for, the customary auger of the mill is stopped and serves as a check valve preventing backflow of the clay through the outlet 146 to the extent one is necessary over and beyond resistance to back-flow provided by the inertia of the mass of clay filling the conduit from the mill to the vat 114 and the resistance of the clay to flow in such a conduit.

What is claimed is:

1. Apparatus for delivering a column of plastic clay to be cut to bats for subsequent forming into green ware and adapted to be connected to a source of plastic clay comprising a vat having an inlet adapted to be connected to said source of clay and an outlet through which clay may be extruded in a column adapted to be cut to bat lengths, means for varying the volume of clay in said vat by expansion and contraction, means to extrude clay from said vat by intermittently expanding said volume-varying means and thereby apply a pulse of pressure to extrude a bat length of clay from said vat, the volume of said bat being equal to the expansion of said volume-varying means during said pressure pulse, the duration of said pulse being determined by the time required to extrude a desired bat length, means to cut a bat-length of clay from the length of clay extruded through the outlet of said vat, said means being actuated by the demand of means receiving a cut bat, means responsive to said volume-varying means to cause clay from said source to be fed into said vat at a greater rate than clay is extruded from said vat as said volume-varying means approaches said limit of expansion and to continue to supply clay to said vat until said volume-varying means approaches a limit of contraction; wherein said volume-varying means comprises a flexible diaphragm separating the portion of said vat containing clay from a portion in which hydraulic fluid is received as the means to expand said diaphragm and in which the means responsive to said diaphragm is a control member attached thereto to actuate means to vary the feed of clay to said vat; wherein the means to expand said diaphragm by an impulse of pressure is a valve actuated to connect the fluid-receiving portion of said vat to a source of fluid pressure to initiate said pulse and to disconnect said portion from said pressure source and connect it to an exhaust line to terminate said pulse, said fluid-receiving portion of said vat being normally connected to said exhaust line through said valve except when said valve connects said portion to said source of fluid pressure; wherein said control member connected to said diaphragm is a rod extending through a wall of the fluid-receiving portion of said vat to actuate switching means commencing the feed of clay to said vat when said fluid-receiving portion approaches its limit of expansion, the resistance of fluid in said fluid-receiving portion of said vat to expulsion through said valve to said exhaust line being less than the force required to extrude clay through said outlet, whereby feed of clay to said vat at a rate greater than the rate of extrusion therefrom by said pressure impulses causes said diaphragm to contract the volume of said fluid-receiving portion until said volume approaches its minimum limit, at which time said control rod actuates switching means to discontinue feed of clay into said vat; and wherein said diaphragm is comprised of a first continuous ply normally contacting the clay in said vat and a second ply contacting the fluid in the fluid-receiving portion of said vat and carrying means for connecting said diaphragm to said control rod.

2. Apparatus as defined in claim 1 in which said means connects said control rod to said diaphragm and permits limited universal movement of said rod with respect to said means; said plies are movable relative to each other and include a lubricant therebetween.

3. Pug mill apparatus comprising a preliminary pug mill for receiving charges of unhomogenized clay and mixing and kneading said clay charges into a plastic columnar extrusion, a secondary pug mill for mixing and kneading said columnar extrusion of clay discharged from said preliminary pug mill to produce a substantially homogenized column of clay, passageway means between the exit end of said preliminary pug mill and the entrance end of said secondary pug mill for permitting passage of said columnar extrusion from said preliminary pug mill to said secondary pug mill, and means disposed in said passageway means for working the clay to remove occluded air including a shredder plate for cutting said columnar extrusion of clay into ribbons, and an auger acting in conjunction with said shredder plate to smear said clay ribbons across one face of said plate to thereby said clay ribbons across one face of said plate to thereby burst and release bubbles of air trapped in said clay, whereby said column of clay discharged from said secondary pug mill is substantially de-aerated.

4. The apparatus as claimed in claim 3 wherein said passageway means further includes a housing in which said shredder plate and auger are disposed, and a vacuum pump connected to said housing for drawing off the air released from said clay.

5. The apparatus claimed in claim 4 including a source of superheated steam connected in said housing for introducing a flow of steam so that air released from said clay may diffuse into said steam and be scavenged from said housing.

6. Pug mill apparatus comprising a preliminary auger-type pug mill, said preliminary pug mill including a cylinder having an entrance end for receiving charges of unmixed and unhomogenized clay, an exit end for discharging a columnar extrusion of mixed clay, and an auger axially extending through said cylinder for mixing and kneading said clay charges and forcing the clay from said exit end of said cylinder; a housing; a passageway connected between said exit end of said preliminary pug mill and said housing; a shredder plate in said housing for cutting said columnar extrusion of clay into ribbons as the clay is forced into said housing; a secondary auger-type pug mill having an entrance end connected to said housing and an exit end, and an auger axially extending through said secondary pug mill into said housing for mixing and kneading said clay ribbons into a homogenized mass and forcing said mass from said exit end, said shredder plate being disposed contiguous to a portion of said auger whereby said clay ribbons will be smeared across a face of said plate to force trapped air from said clay; and a vacuum pump connected to said housing for drawing off air forced from said clay.

7. The apparatus claimed in claim 6 including means for introducing superheated steam into said housing so that air released from said clay will be absorbed into said steam and scavenged from said housing.

8. Pug mill apparatus comprising a preliminary stage auger-type pug mill for receiving charges of unmixed and unhomogenized clay and mixing and kneading said clay, said preliminary stage pug mill having an entrance end and an exit end, a secondary stage auger-type pug mill for mixing and kneading clay into a homogeneous mass, said pug mill having an entrance end through which clay is introduced and an exit end from which the mixed clay is extruded as a homogeneous column by the secondary stage pug mill auger, and means connecting the exit end of said preliminary stage pug mill to the entrance end of said secondary stage pug mill; a vat for receiving the clay column extruded from said pug mill, said vat having a lower open end and a closed upper end, an extrusion die fastened to said lower open end, and feeding means within said vat for forcing clay from said vat through said extrusion die, the clay column being introduced into said vat between said upper and lower ends so that a direction of clay movement through said extrusion die is transverse to the axis of said clay column; motor means for intermittently actuating said secondary stage pug mill auger to intermittently force clay into said vat, and means for intermittently actuating said feeding means to intermittently force clay through said extrusion die; clay cutting means spacedly disposed adjacent the mouth of said extrusion die for cutting clay extruded therefrom into bats, and means for intermittently actuating said cutting means in the intervals between intermittent actuation of said feeding means.

9. The apparaus claimed in claim 8 wherein said connecting means between said preliminary and secondary stage pug mills includes a vacuum chamber, a shredder plate for cutting the clay extruded from said preliminary pug mill into ribbons, and means for working and wiping said ribbons across a face of said shredder plate to release occluded air in said clay.

10. Pug mill apparatus comprising an auger-type pug mill for mixing and kneading clay into a homogeneous mass, said pug mill having an entrance end for receiving clay and an exit end from which clay is extruded by the auger of said pug mill as a homogeneous column, and a motor for intermittently actuating said auger; a vat for receiving said extruded homogeneous column, said vat having an open end and a closed end, means connected to said exit end of said pug mill and to the side of said vat for introducing said clay column with its axis substantially transverse to the axis of said vat between said open and closed ends, and feeding means within said vat adjacent said closed end for forcing clay from said vat through said open end comprising a flexible diaphragm extending across the interior of said vat transversely to its axis, said diaphragm being peripherally secured to the sides of said vat, and a liquid accumulator defined by said diaphragm and said closed end of said vat, an extrusion die mounted on said open end of said vat, and means for intermittently introducing liquid at a controlled rate into said accumulator to flex said diaphragm toward said open end of said vat and extrude clay through said die.

11. The apparatus claimed in claim 10 wherein said means for intermittently introducing liquid into said accumulator comprises a pressure device having a liquid chamber of variable volume connected to said accumulator, said chamber being defined in part by a flexible membrane, and pressurizing means connected to said pressure device for intermittently flexing said membrane to decrease the volume of said chamber and force liquid into said accumulator.

12. Apparatus as claimed in claim 11 including a cutting wire for cutting a bat-length of clay from the end of a column of clay extruded from said vat through said extrusion die, a conveyor, molds on said conveyor, said conveyor carrying molds successively to a portion where a bat-length of clay will be deposited on a positioned mold, and means, responsive to the successive positioning of molds by said conveyor, to actuate said cutting wire.

13. The apparatus as claimed in claim 12 wherein the pressurizing means connected to said pressure device for intermittently flexing the membrane in said pressure device includes a photocell, a light source directing a beam of light toward said cell and across the path of a column of clay extruded from said extrusion die, the path of said wire being intermediate said beam and the outlet of said die, whereby actuation of said cutting wire to cut bat-lengths of clay from the end of said column allows said beam to actuate said cell, a source of fluid under pressure, a normally closed valve between said pressure device and said source of fluid but opened in response to and during the actuation of said cell, whereby clay is intermittently extruded from said die in integers constituting bat-lengths determined by the spacing between the paths of said cutting wire and light beam.

14. The apparatus claimed in claim 13 including a control rod mounted in said pressure device, said control rod being movable in response to movement of said diaphragm, and switch means operable by movement of said control rod to start and stop said motor for intermittently actuating said pug mill auger.

15. The apparatus claimed in claim 14 wherein said switch means comprise a first switch actuatable by said control rod when said liquid chamber of said pressure device is full of liquid, said first switch being connected to said motor to stop the operation thereof, and a second switch operable by said control rod when said liquid chamber is substantially empty, said second switch being connected to said motor to start the operation thereof.

16. The apparatus claimed in claim 15 including a preliminary auger-type pug mill, said preliminary pug mill having an entrance end for receiving charges of unmixed and unhomogenized clay and an exit end through which a columnar extrusion of mixed clay is forced by the auger of said preliminary pug mill, and passageway means connecting said exit end of said preliminary pug mill to the entrance end of said first-mentioned pug mill.

References Cited

UNITED STATES PATENTS

| 102,464 | 4/1870 | Campfield | 73—406 |
| 1,265,676 | 5/1918 | Klump | 73—406 |
| 1,558,530 | 10/1925 | Wunsch | 73—406 |
| 2,313,056 | 3/1943 | Emerson et al. | 25—22 |
| 2,497,510 | 2/1950 | Miller | 25—22 |
| 3,024,649 | 3/1962 | Taber | 73—395 |
| 3,067,614 | 12/1962 | Rich | 73—395 |

WILLIAM J. STEPHENSON, *Primary Examiner.*

U.S. Cl. X.R.

25—14, 22; 264—102